US012712613B2

(12) United States Patent
Smeets et al.

(10) Patent No.: US 12,712,613 B2
(45) Date of Patent: Aug. 18, 2026

(54) SPATIAL DOMAIN SELF-DECODING OF ENCRYPTED COMMUNICATION

(71) Applicant: TELEFONAKTIEBOLAGET LM ERICSSON (PUBL), Stockholm (SE)

(72) Inventors: Bernard Smeets, Lund (SE); Raihan Rafique, Lund (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/113,254

(22) PCT Filed: Sep. 19, 2022

(86) PCT No.: PCT/IB2022/058844

§ 371 (c)(1),
(2) Date: Mar. 19, 2025

(87) PCT Pub. No.: WO2024/062270

PCT Pub. Date: Mar. 28, 2024

(65) Prior Publication Data

US 2026/0005740 A1 Jan. 1, 2026

(51) Int. Cl.
*H04B 7/06* (2006.01)
*H04L 9/08* (2006.01)
*H04L 9/40* (2022.01)

(52) U.S. Cl.
CPC ......... *H04B 7/0617* (2013.01); *H04L 9/0869* (2013.01); *H04L 63/0428* (2013.01)

(58) Field of Classification Search
CPC .. H04B 7/0617; H04L 9/0869; H04L 63/0428
See application file for complete search history.

(56) References Cited

U.S. PATENT DOCUMENTS 7,312,750 B2 * 12/2007 Mao .................... H01Q 3/2605 342/373
2017/0244685 A1 * 8/2017 Mirza ...................... H04L 9/14
(Continued)

OTHER PUBLICATIONS

International Search Report and Written Opinion for International Patent Application No. PCT/IB2022/058844, mailed Apr. 20, 2023, 10 pages.

(Continued)

*Primary Examiner* — Erika A Washington
(74) *Attorney, Agent, or Firm* — Withrow & Terranova, PLLC

(57) ABSTRACT

Various embodiments of the present disclosure provide for a method and apparatuses that perform spatial encoding in a multipath environment such that transmissions on different beams are separately encrypted with complex codes such that when the transmissions on the different beams are received at the receiver, the separate encryptions are cancelled out. The transmissions can also have time delay, gain, and phase modifications made to the transmissions such that the automatic self-decryption is performed within a predefined distance of where the receiver is determined to be. In this way, encryption/decryption keys do not have to be sent to the receiver, and unauthorized devices that intercept the beams at a location other than the receiver location will not be able to decrypt the communication.

20 Claims, 13 Drawing Sheets

(56) References Cited

U.S. PATENT DOCUMENTS

2018/0034539 A1* 2/2018 Buer .................. H04B 7/18513
2020/0044840 A1 2/2020 Chang
2022/0248218 A1 8/2022 Zach et al.

OTHER PUBLICATIONS

Intention to Grant for European Patent Application No. 22789297.3, mailed May 7, 2026, 7 pages.

* cited by examiner

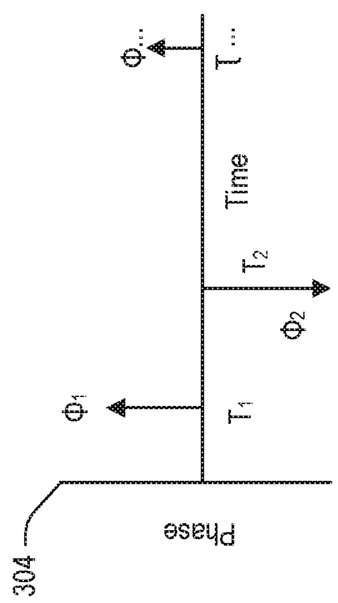
304
Phase
$\Phi_1$
$\Phi_2$
$\Phi_{...}$
$T_1$
$T_2$
Time
T ...
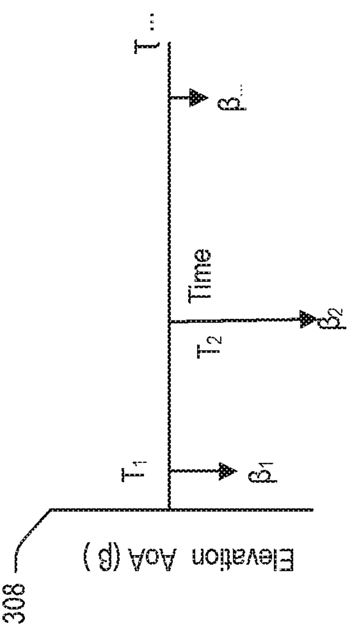
308
Elevation AoA (β)
$\beta_1$
$\beta_2$
$\beta_{...}$
$T_1$
$T_2$
Time
T ...
FIG. 3
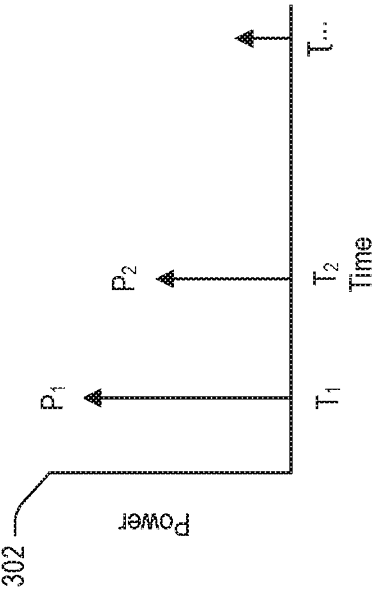
302
Power
$P_1$
$P_2$
$T_1$
$T_2$
Time
T...
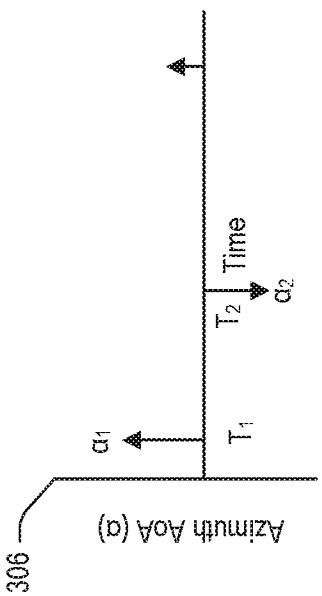
306
Azimuth AoA (α)
$\alpha_1$
$\alpha_2$
$T_1$
$T_2$
Time

SPATIAL DOMAIN SELF-DECODING OF ENCRYPTED COMMUNICATION

PRIORITY CLAIM

This application is a national stage application of International Patent Application No. PCT/IB2022/058844, filed Sep. 19, 2022, the disclosure disclosures of which is hereby incorporated in its entirety by reference.

TECHNICAL FIELD

The present disclosure relates to a wireless communication system, and more specifically to utilizing encryption in a multipath environment.

BACKGROUND

An encryption key is a random string of bits created explicitly for scrambling and unscrambling data. Encryption keys are associated with encryption algorithms. For the security of the encryption, it is crucial that every key is unpredictable. Symmetric forms of encryption systems make use of a single key to serve as input to both decryptor and encryptor. Public asymmetric encryption systems make use of highly secure algorithms as well, but using a different strategy for encryption and decryption. The asymmetric encryption method uses two keys, referred to as a key pair. One is a public key, and the other one is a private key.

Cryptographic Key Management (CKM) is a fundamental part of cryptographic technology and is considered one of the most difficult aspects associated with the use of cryptographic procedures. Keys have to be securely exchanged between the communicating parties and they have to be kept secret over time. Of particular concern are the scalability of the methods used to distribute keys and the usability of these methods. If any eavesdropper, or person not authorized to view a communication has one or both keys, depending on whether the symmetric or asymmetric, the non-authorized person may have access to and the ability to decrypt the encrypted communication. This problem is exacerbated when the communications are transmitted wirelessly and any device or within range of the wireless communication, if the device has the keys, may be able to access the wireless communication.

If the communication is in a multipath environment, like the prior art embodiment depicted in FIG. 1, the eavesdropping device can be in any path to listen. In FIG. 1, a transmitter 102 (e.g., a base station) can send a wireless communication to receiver 104 (e.g., a wireless communications device). The wireless communication can reach receiver 104 via a plurality of paths, for example by Path 1 108 and Path 2 106. Path 1 108 can be direct, while Path 2 106 can reflect off a reflective surface 110. Since the transmission associate with both paths is the same, an eavesdropper 112 in the path of one of the beams, can receive the wireless transmission. Even if wireless encryption can be transmitted the problems of CKM makes this not very attractive. But even if encryption is used cryptoanalysis is facilitated because the eavesdropper has access to the encrypted data when having access to both paths Quantum encoding can make the decoding task more difficult, but also here CKM implies that the encoding information would need to be sent to receiver device 104, which means a separate time/frequency slot would be needed to transmit the encrypting code. If that is in public, device 112 would be able to receive to the encryption code to decode the other wireless communication.

SUMMARY

Various embodiments of the present disclosure provide for a method and apparatuses that perform spatial domain encoding in a multipath environment such that transmissions on different beams are separately encrypted with complex codes such that when the transmissions on the different beams are received at the receiver, the separate encryptions are cancelled out, when the signals are summed. The transmissions can also have time delay, gain, and phase modifications made to the transmissions such that the automatic self-decryption is performed within a predefined distance of where the receiver is determined to be. In this way, encryption/decryption keys do not have to be sent to the receiver, and unauthorized devices that intercept the beams at a location other than the receiver location will not be able to decrypt the communication.

In an embodiment, a method can be performed by a transmitter node for spatially encrypting a communication in a multipath environment. The method can include determining multipath information for the communication between the transmitter node and a receiver node, wherein the communication comprises a first beam associated with a first set of antenna elements and a second beam associated with a second set of antenna elements. The method can also include duplicating a signal associated with the communication into a first signal and a second signal. The method can also include applying a first complex code to the first signal that modifies a phase and a gain of the first signal, wherein the first complex code is based on a complex random number generator. The method can also include applying a second complex code to the second signal that modifies a phase and a gain of the second signal, wherein the second complex code is based on a function of the first complex code, the first set of antenna elements, the second set of antenna elements, a first power associated with the first set of antenna elements, and a second power associated with the second set of antenna elements. The method can also include transmitting the first signal via the first beam and the second signal via the second beam to a receiver node.

In an embodiment, the method can also include, prior to the applying the first complex code applying a first time delay and a first set of beamforming weights to the first signal based on multipath information associated with the first beam and applying a second time delay and a second set of beamforming weights to the second signal based on multipath information associated with the second beam.

In an embodiment, the second complex code is determined such that when a first transmission associated with the first signal and a second transmission associated with the second signal are received at the receiver node, a first encryption to the first transmission caused by the first code is canceled out by a second encryption to the second transmission caused by the second code.

In an embodiment, prior to determining the multipath information, the method can include receiving, from the receiver node, a reference signal, wherein the multipath information is based on the reference signal.

In an embodiment, the method can include receiving from the receiver node, new reference signals at predefined intervals and updating the multipath information based on each new reference signal for a respective interval.

In an embodiment, the method can include updating the first complex code and the second complex code at predefined intervals.

In an embodiment, the first beam and the second beam traverse different paths to the receiver node.

In an embodiment, the first signal and the second signal are identical prior to the first set of beamforming weights and the second set of beamforming weights being applied. In an embodiment, the first beam and the second beam are associated with spatial multiplexing channels with highest signal strengths.

In an embodiment, the first power associated with the first set of antenna elements is based at least in part on the gain of the first signal and a number of antenna elements of the first set of antenna elements.

In an embodiment, the second power associated with the second set of antenna elements is based at least in part on the gain of the second signal and a number of antenna elements of the second set of antenna elements.

In another embodiment, a transmitter node can be provided to spatially encrypt a communication in a multipath environment, where the transmitter node can include a radio interface and processing circuitry to perform various functions. In an embodiment, the transmitter node can determine multipath information for the communication between the transmitter node and a receiver node, wherein the communication comprises a first beam and a second beam, duplicate a signal associated with the communication into a first signal and a second signal, apply the first signal with a first complex code that modifies a phase and a gain of the first signal, wherein the first complex code is based on a complex random number generator, apply the second signal with a second complex code that modifies a phase and a gain of the second signal, wherein the second complex code is based on a function of the first complex code, the first set of antenna elements, the second set of antenna elements, a first power associated with the first set of antenna elements, and a second power associated with the second set of antenna elements, and transmit, to the receiver node, the first signal via the first beam and the second signal via the second beam.

In another embodiment, the transmitter node, prior to applying the first complex code can apply a first time delay and a first set of beamforming weights to the first signal based on multipath information associated with the first beam and apply a second time delay and a second set of beamforming weights to the second signal based on multipath information associated with the second beam.

In an embodiment, the second complex code is determined such that when a first transmission associated with the first signal and a second transmission associated with the second signal are received at the receiver node, a first encryption to the first transmission caused by the first code is canceled out by a second encryption to the second transmission caused by the second code.

In an embodiment, prior to determining the multipath information, the transmitter node can receive, from the receiver node, a reference signal, wherein the multipath information is based on the reference signal.

In an embodiment, the transmitter node can receive from the receiver node, new reference signals at predefined intervals and update the multipath information based on each new reference signal for a respective interval.

In an embodiment, the transmitter node can update the first complex code and the second complex code at predefined intervals.

In an embodiment, the first beam and the second beam traverse different paths to the receiver node.

In an embodiment, the first signal and the second signal are identical prior to the first set of beamforming weights and the second set of beamforming weights being applied.

In an embodiment, the first beam and the second beam are associated with spatial multiplexing channels with highest signal strengths.

In an embodiment, the transmitter node is at least one of a base station device or a wireless communication device, and the receiver node is at least one of a wireless communication device or a base station device.

In an embodiment, the first power associated with the first set of antenna elements is based at least in part on the gain of the first signal and a number of antenna elements of the first set of antenna elements.

In an embodiment, the second power associated with the second set of antenna elements is based at least in part on the gain of the second signal and a number of antenna elements of the second set of antenna elements.

In another embodiment, a non-transitory computer-readable storage medium that includes executable instructions to cause a processor device of a transmitter node to receive, from a receiver node, a reference signal, determine multipath information for the communication between the transmitter node and a receiver node based on the reference signal, wherein the communication comprises a first beam associated with a first set of antenna elements and a second beam associated with a second set of antenna element, duplicate a signal associated with the communication into a first signal and a second signal, apply the first signal with a first complex code that modifies a phase and a gain of the first signal, wherein the first complex code is based on a complex random number generator, apply the second signal with a second complex code that modifies a phase and a gain of the second signal, wherein the second complex code is based on a function of the first complex code, the first set of antenna elements, the second set of antenna elements, a first power associated with the first set of antenna elements, and a second power associated with the second set of antenna elements, and transmit, to the receiver node, the first signal via the first beam and the second signal via the second beam.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates exemplary graphs depicting multipath parameters according to some embodiments of the present disclosure;

DETAILED DESCRIPTION

Figure 1:
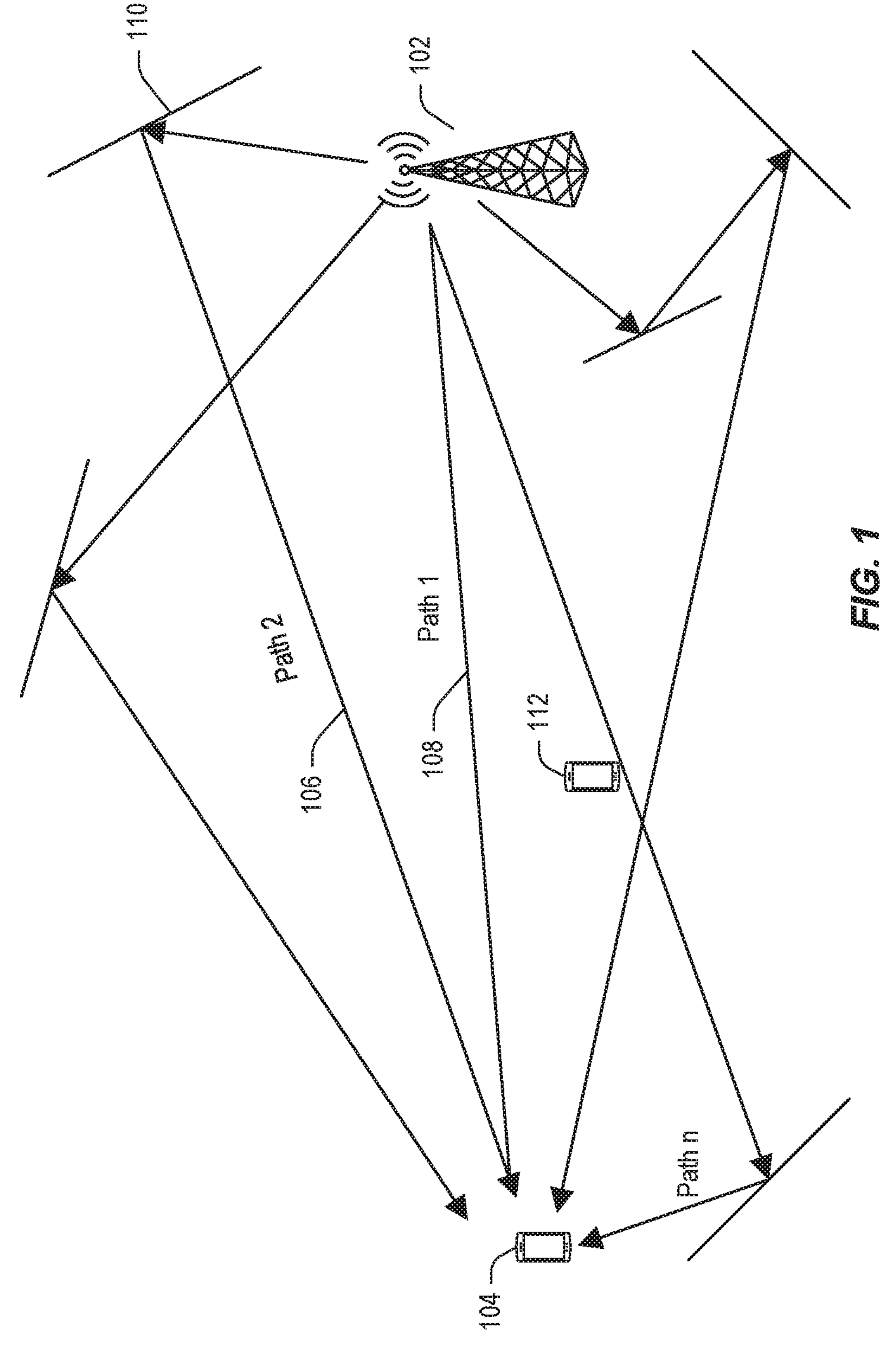
FIG. 1 illustrates an exemplary multipath environment.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Transmitter and Receiver Nodes: As used herein, a "transmitter node" or "transmitter device" and "receiver node" or "receiver device" could be any radio access node or wireless communication device. If a Figure depicts the transmitter node being a radio access node, and the receiver node being a wireless communication device, it is to be appreciated that this is merely for ease of depiction, and in other embodiments, the transmitter node and receiver node could be any combination of radio access nodes or wireless communication devices.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term “cell”; however, particularly with respect to 5G NR concepts, beams may be used instead of cells and, as such, it is important to note that the concepts described herein are equally applicable to both cells and beams.

Various embodiments of the present disclosure provide for a method and apparatuses that perform encoding in a multipath environment such that transmissions on different beams are separately encrypted with complex codes such that when the transmissions on the different beams are received at the receiver, the separate encryptions are cancelled out. The transmissions can also have time delay, gain, and phase modifications made to the transmissions such that the automatic self-decryption is performed within a predefined distance of where the receiver is determined to be. In this way, encryption/decryption keys do not have to be sent to the receiver, and unauthorized devices that intercept a beam at a location other than the receiver location will not be able to decrypt the communication.

The time delay, gain, and phase modifications that are applied to the transmissions can be based on multipath information that the transmitter determines based on receiving a reference signal from the receiver node. The receiver node at predefined intervals can transmit a reference signal, and the reference signal can arrive at the transmitter node via multiple different paths. The transmitter device can select the paths to use for transmitting the encrypted communication (e.g., the paths with the highest signal strength or some other parameter) and then determine the relative time delay offsets, gain differences, and phase differences for the selected paths.

Figure 2:
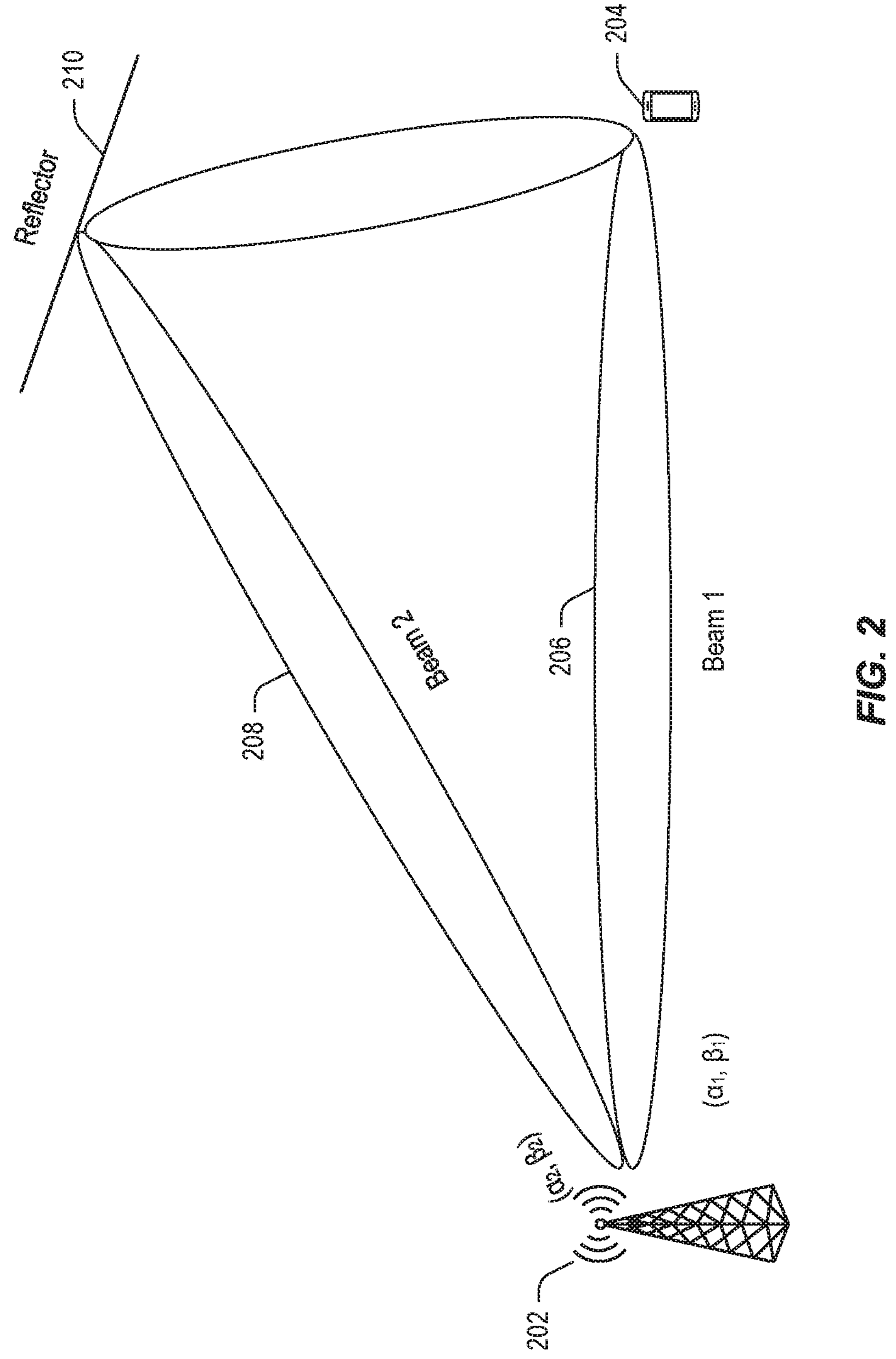
FIG. 2 illustrates an exemplary multipath environment with two dominant paths in which spatial encryption is performed according to some embodiments of the present disclosure.

FIG. 2 illustrates an exemplary multipath environment in which spatial encryption is performed according to some embodiments of the present disclosure. In FIG. 2, the receiver device 204 can be a wireless communication device, and the transmitter device 202 can be a base station device. The transmitter device 202 can transmit a communication based on a signal to the receiver device 204. In an embodiment as disclosed herein, the transmitter device 202 can send two encrypted communications, each based on the same underlying signal, along a first beam 206 and a second beam 208 (via reflector device 210) to the receiver device 204. The receiver device 204 can receive the two transmissions and in response to the two transmissions interfering with each other, the communication automatically self-decrypts. The self-decryption can only occur within a predefined location based on the time delay and gain modifications and phase modifications, with phase variation tolerance, made to each of the two transmissions based on the multipath information determined by the transmitter device 202.

The transmitter device 202 has access to the multipath channel information, including the time delay offsets, and amplitude or gain offsets, and phase offsets and angles of arrival (AoA) determined based on a received reference signal from the receiver device 204.

FIG. 3 depicts several of the gain, phase and Angle of Arrival (AoA) differences associated with the two beams 206 and 208 based on the received reference signal. For example, graph 302 depicts the gain $P_1$ and $P_2$ of the beams 206 and 208 respectively, the graph 304 depicts the phase $\Phi_1$ and $\Phi_2$ of the beams 206 and 208. Likewise, graphs 306 and 308 depict the azimuth $\alpha_1$ and $\alpha_2$ and the elevation differences $\beta_1$ and $\beta_2$ between the beams 206 and 208, respectively. These are some of the multipath parameters of the multipath communication between the transmitter device 202 and the receiver device 204.

Based on these multipath parameters from the measured data, the multipath information of time delay, strength, phase, and direction is accessible for different paths through which the reference signal from the receiver device 204 is arriving at the transmitter device 202. For the encrypted communication, the transmitter device 202 can create at least two beams with the same signal in the directions where the strength could be maximum in a Time Division Duplex (TDD) system (where the channels are reciprocal). In an embodiment, each antenna element of the multi antenna system can get weighting factors after time alignment so that the transmitter device 202 will create at least two separate beams of the same signal.

Furthermore, a complex number generator will give an additional complex weight of phase and gain. This weight will be random and can be updated at every time interval or other predefined interval. That weight will be applied to all the elements which are creating the first beam 206. Based on the first complex code, and the number and powers of antenna elements in the respective sets of antenna elements associated with the first and second beams, a second complex code can be determined, and then applied to the elements associated with the second beam 208. This relationship means that the two separate weighting factors are entangled for a given set of multipath data, and enables the two or more transmissions, when interfering with each other when arriving simultaneously at the receiver to cancel out the encryption provided by the first complex code and the second complex code. It is to be appreciated that when the present disclosure states “first set of antenna elements” and “second set of antenna elements” that, in some embodiments, the sets of antenna elements can overlap completely or partially, where some or all of the first set of antenna elements are also the second set of antenna elements. This is particularly true for a case where the transmitter is a digital beamforming transmitter, with different precoding weights applied to separate beams.

An unauthorized device, such as device 112 in FIG. 1, can listen to any of the paths as stated earlier, however in presence of encryption and absence of code, the device 112 will be unable to decrypt the information unless the device 112 was located within a predefined distance of the receiver device 204.

In a multipath environment, the components with the major strengths are $P_1$ and $P_2$ which appears at times of $\tau_1$ and $\tau_2$ with phases $\theta_1$ and $\theta_2$ with an angle of arrivals, (AoA), ($\alpha_1$, $\beta_1$) and ($\alpha_2$, $\beta_2$) where $\alpha$ is the azimuth angle and $\beta$ is the elevation angle about the antenna array of the transceiver.

For the embodiment with analog beamforming, let the antenna array has N elements, where $N_1$ elements are to create a beam at the directions of ($\alpha_1$, $\beta_1$) and $N_2$ elements are to create a beam at the directions of ($\alpha_2$, $\beta_2$). In an embodiment where the transmitter is a digital beamformer, all the elements will have both beams, and only the gain of each beam will be replaced with a new gain, (which is inversely proportional to path loss).

Let the time varying first complex code for the 1st direction be:

$$C_1 = a_1 + jb_1 \quad \text{Eqn. 1}$$

If the transmitting signal is S(t), the signal for 1st direction to be transmitted is:

$$S\_in_1(t) = S(t-\tau_1) \cdot C_1(t-\tau_1) \cdot \sum_{i=1}^{N_1} w_{i,1} \quad \text{Eqn. 2}$$

The signal at the receiver 204 would be:

$$S\_out_1(t) = N_1P_1 \cdot S(t) \cdot C_1(t) + n0_1 \quad \text{Eqn. 3}$$

Similarly, for a second complex code for the 2nd direction:

$$C_2 = a_2 + jb_2 \quad \text{Eqn. 4}$$

$$S\_out_2(t) = N_2P_2 \cdot S(t) \cdot C_2(t) + n0_2 \quad \text{Eqn. 5}$$

Where $n0_1$ and $n0_2$ are noises for each of the beams. The combined signal, after time alignment with applied delays at the receiver would be:

$$S_r(t) \approx N_1P_1 \cdot S(t) \cdot C_1(t) + n0_1 + N_2P_2 \cdot S(t) \cdot C_2(t) + n0_2 \quad \text{Eqn. 6}$$

As the received signal supposed to be the S(t):

$$N_1P_1 \cdot S(t) \cdot C_1(t) + N_2P_2 \cdot S(t) \cdot C_2(t) = NP \cdot S(t) + n_0 \quad \text{Eqn. 7}$$

Where P is the expected attenuation for optimized transmission with total elements, such as:

$$P = fac \cdot \min(P_1, P_2) \quad \text{Eqn. 8}$$

fac is a scalar factor, where the maximum value could be 1. And where the total noise $n_0 = n0_1 + n0_2$, thus:

$$N_1P_1 \cdot C_1(t) + N_2P_2 \cdot C_2(t) \approx NP \quad \text{Eqn. 9}$$

Or

-continued $$C_2(t) \approx \frac{1}{N_2P_2} \cdot (NP - N_1P_1 \cdot C_1(t))$$

$$C_2(t) \approx \left(\frac{NP}{N_2P_2} - \frac{N_1P_1}{N_2P_2} \cdot C_1(t)\right) \quad \text{Eqn. 10}$$

So for a given instantaneous first complex code $C_1$ and the given constraint:

$$(a_2 + jb_2) \approx \left(\frac{NP}{N_2P_2} - \frac{N_1P_1}{N_2P_2} \cdot (a_1 + jb_1)\right) \quad \text{Eqn. 11}$$

Thus:

$$a_2 \approx \frac{NP}{N_2P_2} - \frac{N_1P_1}{N_2P_2} \cdot a_1 \quad \text{Eqn. 12}$$

Similarly:

$$b_2 = -b_1 \cdot \frac{N_1P_1}{N_2P_2} \quad \text{Eqn. 13}$$

As can be seen in Eqn. 10 above, the second complex code is a function of the first complex code, as well as a function of a number of the first set of antenna elements, the second set of antenna elements, a first power associated with the first set of antenna elements, and a second power associated with the second set of antenna elements. In an embodiment, the function could be different if the desired gain of the received signal is different.

Figure 4:
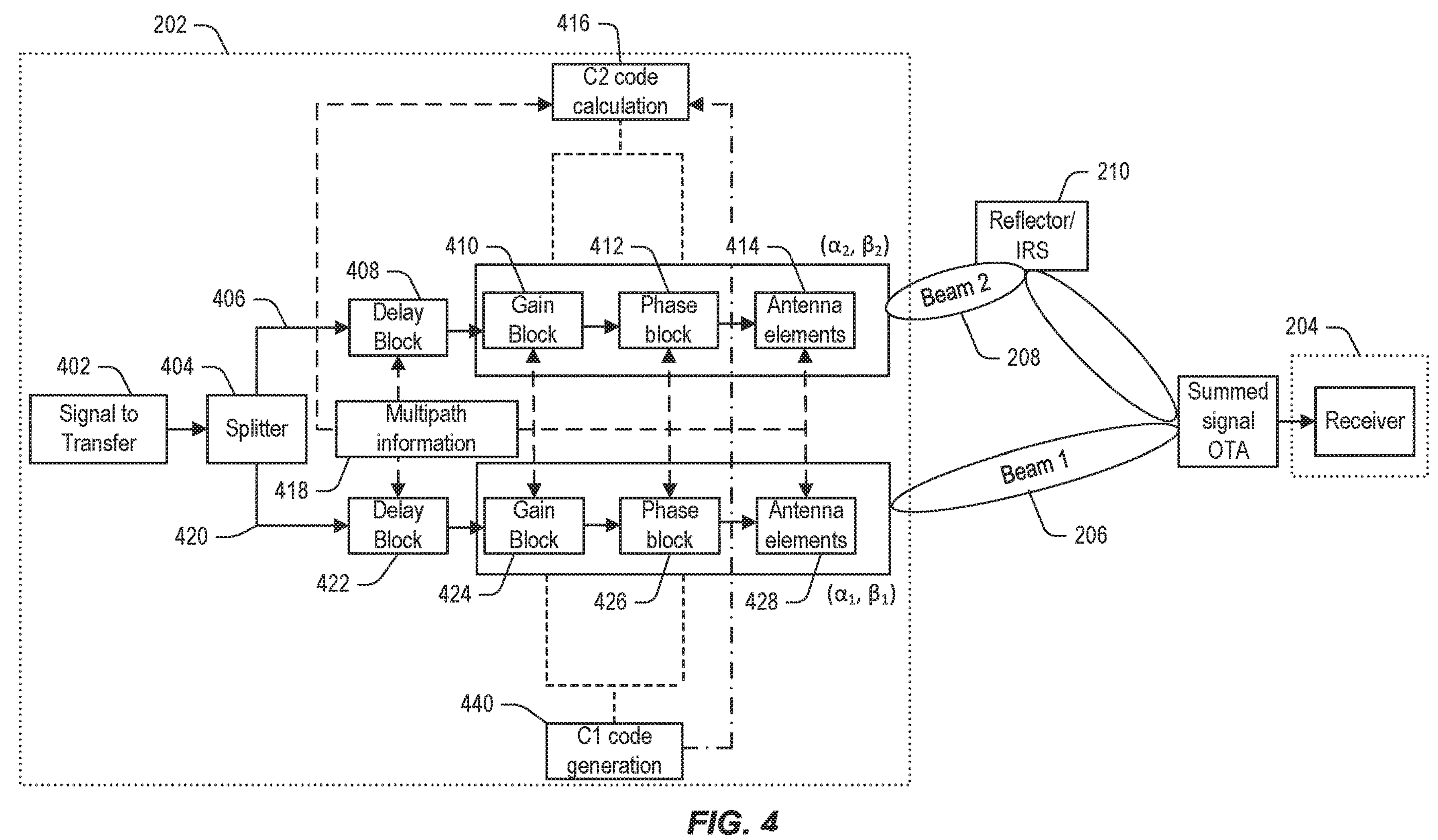
FIG. 4 illustrates an exemplary analog beam forming transmitter device in a multipath environment in which spatial encryption is performed according to some embodiments of the present disclosure.

FIG. 4 illustrates an exemplary analog beamforming transmitter device 202 in a multipath environment in which encryption is performed according to some embodiments of the present disclosure. In an embodiment, the transmitter device 202 could be a digital beamforming transmitter, with some modifications to the equations described above. FIG. 4 illustrates the system overview and corresponding signal flow. Transmitter device 202 determines which antenna elements correspond to beam 1 (antenna elements 428) and which antenna elements correspond to beam 2 (antenna elements 414). Corresponding phase and gain values are added to the respective antenna elements so that they create their beams towards ($\alpha_1$, $\beta_1$) and ($\alpha_2$, $\beta_2$). The phase ($\theta_1$ and $\theta_2$) and time delay ($\Delta t = \tau_1 - \tau_2$) for the selected paths are compensated for by adjustments performed by the delay blocks 408 and 422 and the phase blocks 412 and 426. The gain blocks 410 and 424 can also compensate for any interferences on the respective paths so that both transmissions are received at the receiver device 204 with comparable signal strengths.

A signal 402 that comprises information to be communicated to receiver 204 can be split by a splitter 404 into two corresponding signals 420 and 406 which will be sent via separate beams to the receiver 204 along different paths.

The first signal 420 can first have a time delay applied by delay block 422 to account for different path lengths between beam 206 and beam 208. The gain block 424 and phase block 426 can also apply gain and phase modifications which comprise the beamforming weights. The delay block 422, gain block 424, and phase block 426 can modify the signal 420 based on the multipath information 418 determined by the transmitter 202 from the reference signal received from the receiver 204. The code generator 440 can also apply a first complex code to the signal 420 via the gain block 424 and the phase block 426. The first complex code can be a random code that is based on the output of a complex number generator. After the first complex code is applied to the signal 420, the signal is transmitted by the first set of antenna elements 428 along beam 1 206.

The second signal 406 can first have a time delay applied by delay block 408 to account for different path lengths between beam 206 and beam 208. The gain block 410 and phase block 412 can also apply gain and phase modifications which comprise the beamforming weights. The delay block 408, gain block 410, and phase block 412 can modify the signal 406 based on the multipath information 418 determined by the transmitter 202 from the reference signal received from the receiver 204. The code generator 416 can also apply a second complex code to the signal 406 via the gain block 410 and the phase block 412. The second complex code can be based on a function of the first complex code, a number of the first set of antenna elements 428, a number of the second set of antenna elements 414, a first power associated with the first set of antenna elements 428, and a second power associated with the second set of antenna elements 414. After the first complex code is applied to the signal 406, the signal is transmitted by the second set of antenna elements 414 along beam 2 208.

When the two transmissions on the two beams 206 and 208 are received at the receiver 204, and the first complex code and second complex code cancel themselves in response to the transmission interfering with each other, and the receiver device 204 has received communication that was encrypted in transit, but due to the automatic self-decryption, there are no keys or passwords or other information necessary to decrypt the communication.

Figure 5:
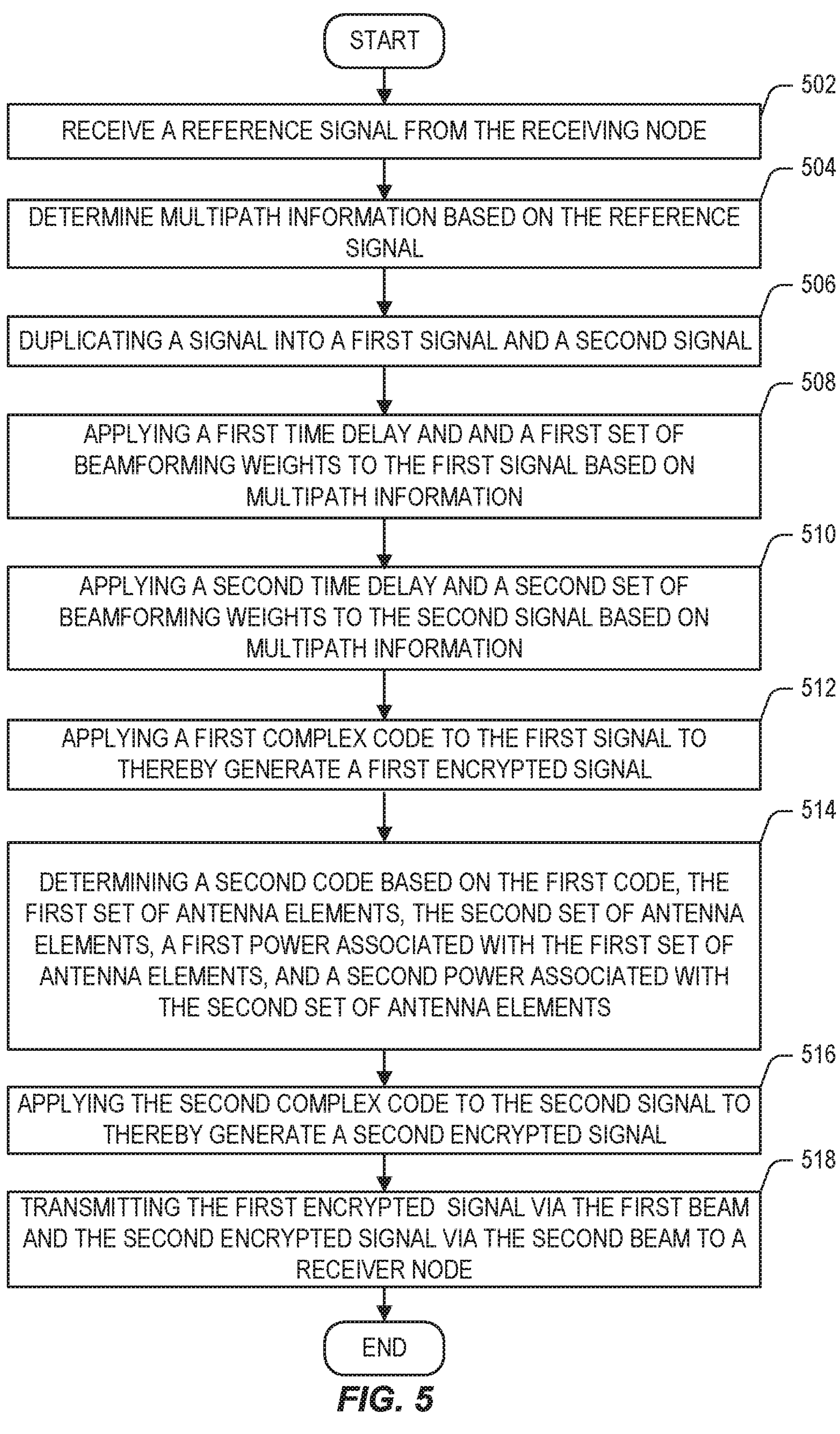
FIG. 5 illustrates an exemplary method in which spatial encryption in a multipath environment is performed according to some embodiments of the present disclosure.

FIG. 5 illustrates a method for spatially encrypting a communication in a multipath environment.

The method can start at step 502, where the method includes receiving a reference signal from the receiving node. In an embodiment, at predefined time intervals, the receiving device 204 can send a reference signal (e.g., channel state information reference signal or a demodulation reference signal).

At step 504, the method includes determining multipath information based on the reference signal. The transmitter device 202 determines the multipath information from the reference signal that arrived at the transmitter device 202 via a plurality of paths. The multipath information can include the time delay offsets, and amplitude or gain offsets, and phase offsets and angles of arrival (AoA) determined based on a received reference signal from the receiver device 204. The paths that have the highest signal strength, or lowest interference, or shortest path, or some other metric can be selected as the paths for which to send the transmissions back to the receiver device 204.

At step 506, the method includes duplicating a signal into a first signal 420 and a second signal 406. The duplicating can be performed by splitter 404 and the first signal 420 and the second signal 406 can be the same signals in some embodiments. In an embodiment where the transmitter is a digital beamformer, the duplicating would be performed by a duplicating block.

At step 508, the method includes applying a first time delay and a first set of beamforming weights to the first signal 420 based on the multipath information. The delay block 422 and gain block 424 and phase block 426 can apply time delay and beamforming weights which comprise phase and gain modifications. In an embodiment, the first time delay is the extracted delay for the second beam. By applying the delay, the signals can arrive at the same time at the receiver.

At step 510, the method includes applying a second time delay and a second set of beamforming weights to the second signal 406 based on multipath parameter information. The delay block 408 and gain block 410 and phase block 412 can apply time delay and beamforming weights which comprise phase and gain modifications. In an embodiment, the second time delay is the extracted delay for the first beam. By applying the delay, the signals can arrive at the same time at the receiver At step 512, the method includes applying a first complex code to the first signal. The first complex code can be generated by a complex random number generator that provides an additional complex weight of phase and gain. In an embodiment, there could be two complex random number generators, one for amplitude, one for phase. In an embodiment, the complex random number generator could be a quantum random number generator. In theory the value of gain and phase could be anything, while in practice for linearity of the radio circuit the amplitude could be in between 0.5-1 and phase could be between −45 to 45 degrees This weight will be random and can be updated at every time interval or other predefined interval.

At step 514, the method includes determining the second code based on the first code. The second complex code can be a function of the first complex code, as well as a function of a number of the first set of antenna elements, the second set of antenna elements, a first power associated with the first set of antenna elements, and a second power associated with the second set of antenna elements. The second complex code can be updated at the same time the first complex code is updated.

At step 516, the method includes applying the second complex code to the second signal.

At step 518, the method includes transmitting the first signal via the first beam and the second signal via the second beam to a receiver node. To accomplish the transmitting the first signal and the second signal, the transmitter device 202 can apply phase and gain adjustments and phase compensation for each path to the separate signals.

Figure 6:
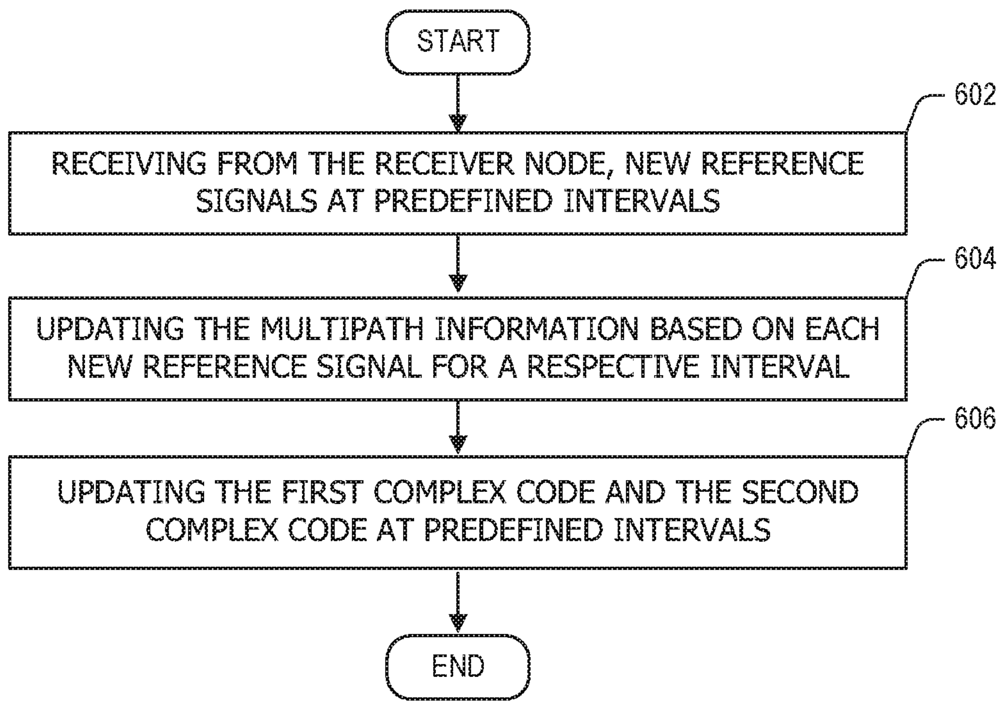
FIG. 6 illustrates an exemplary method in which spatial encryption in a multipath environment is performed according to some embodiments of the present disclosure.

FIG. 6 illustrates another exemplary method in which spatial encryption in a multipath environment is performed.

At 602, the method includes receiving from the receiver node, new reference signals at predefined intervals. The predefined intervals can be every Transmission Time Interval or any other defined interval. In an embodiment, the interval can be shorter than a reference signal subframe.

At 604, the method includes updating the multipath information based on each new reference signal for a respective interval. Since the link conditions may be highly variable, and the transmitter device 202 and the receiver device 204 may be moving relative to each other, generating new multipath information will enable the receiver 204 to properly automatically self-decrypt the communications received from the transmitter device 202 since the self-decryption of the two transmissions is contingent on the receiver being spatially in the right area where the first complex code and second complex code cancel each other.

At 606, the method includes updating the first complex code and the second complex code at predefined intervals. Similar to the multipath information be updated at regular intervals, the first complex code and the second complex code can also be updated at regular intervals at the transmitting side without any need to inform the receiving parties. The update intervals for the first and second complex code and the multipath information can be different from each other or can be performed at the same time.

Figure 7:
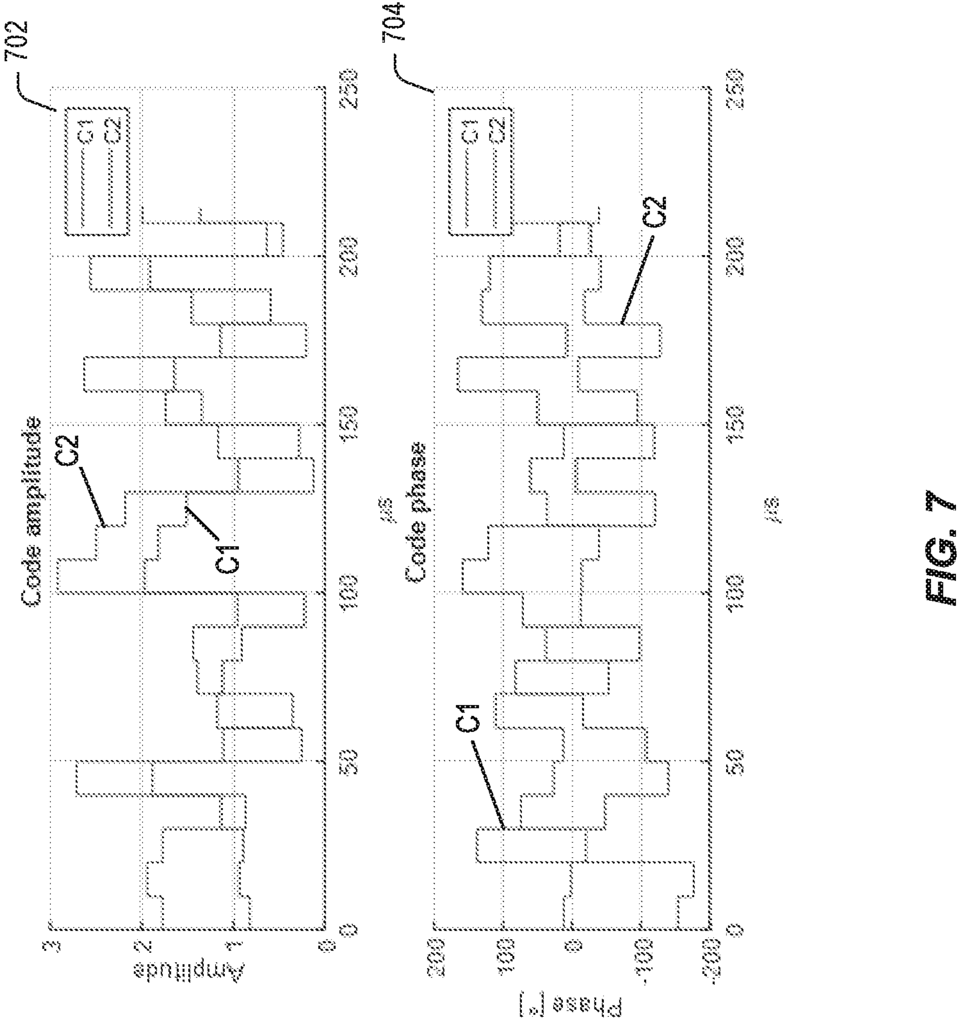
FIG. 7 illustrates exemplary graphs depicting code amplitude and phase according to some embodiments of the present disclosure.

FIG. 7 illustrates exemplary graphs 702 and 704 depicting code amplitude and phase according to some embodiments of the present disclosure. Graph 702 depicts the amplitudes over time of the simulated first complex code and second complex code, where the amplitude of the first complex code C1 varies between 0.2 and 2, which in turn cause the second complex code C2 to swing between 0.2 and 3, which results a 4 dB gain. The graph 704 depicts the applied random phase for C1 and corresponding phase for C2 for the given multi path environment. In an embodiment, the code could be updated every 10 μs.

Figure 8:
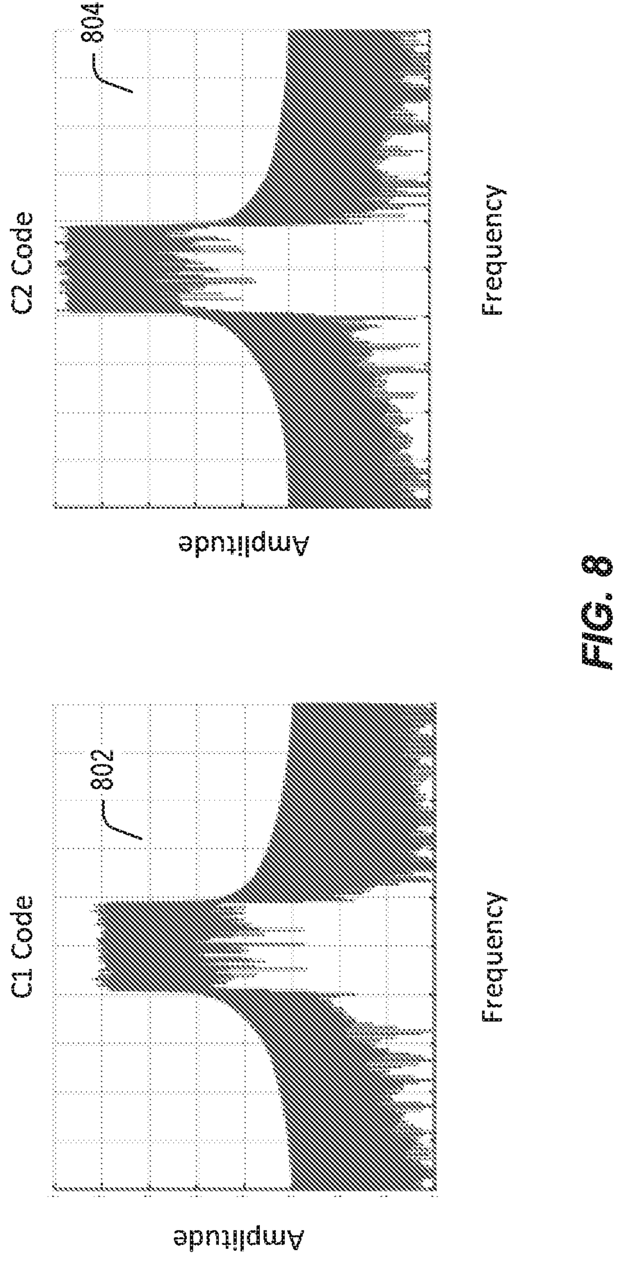
FIG. 8 illustrates exemplary graphs depicting code amplitude as a function of frequency according to some embodiments of the present disclosure.

FIG. 8 illustrates exemplary graphs depicting code amplitude as a function of frequency according to some embodiments of the present disclosure. FIG. 8 shows an example of a set of simulated spectrums of Coded signal for the first complex code in graph 802 and the second complex code in graph 804. The simulation is done with a 20 MHz standard LTE signal for a sampling frequency of 106.25 MHz the code is applied in every 1 μs. The calculated normalized mean square error (NMSE) for signal one at beam one is 2.99 dB while −8.13 dB for beam 2. In a non-simulated, real-world telecommunication system, the figure of merit for evaluating signal would not be NMSE, rather Error Vector Magnitude (EVM) or Bit Error Rate (BER).

Figure 9:
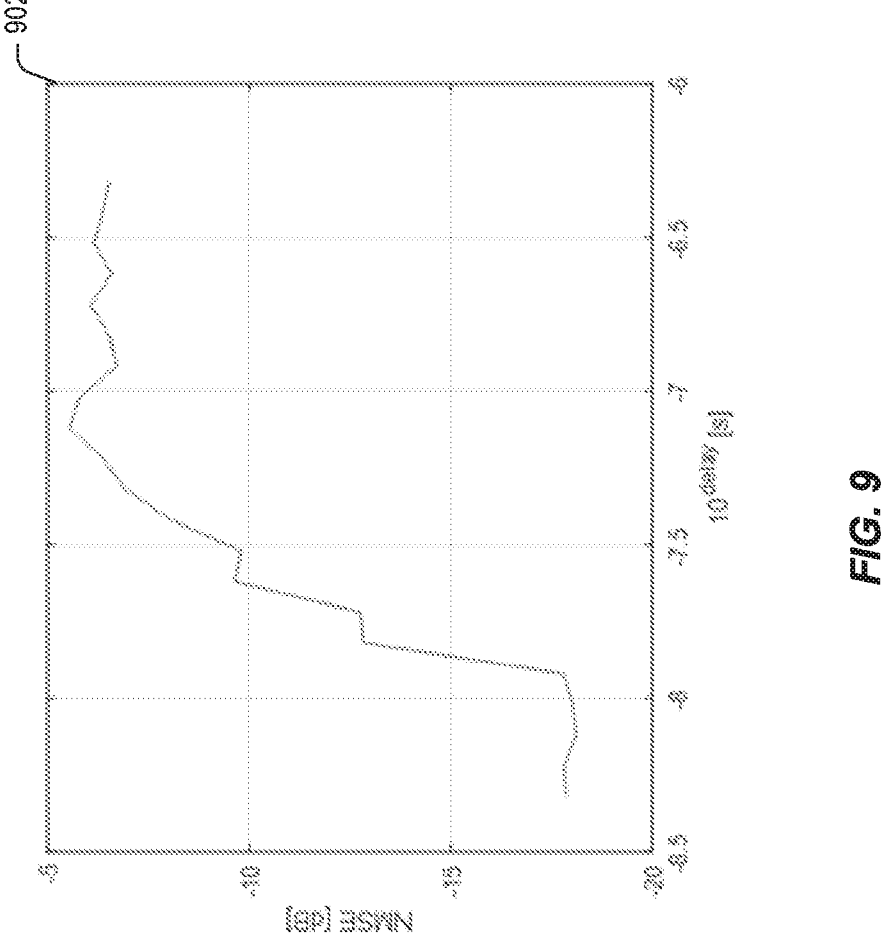
FIG. 9 illustrates an exemplary graph depicting Normalized Mean Square Error of spatial decryption according to some embodiments of the present disclosure.

FIG. 9 illustrates an exemplary graph 902 depicting NMSE of spatial decryption according to some embodiments of the present disclosure. Based on the NMSE calculation, as the delay between two paths increase, so does distortion. At some point the decryption quality with natural summing may not help to extract the original information. Thus the summed signal quality is reduced in comparison to the transmitted signal. In the present disclosure, the quality is estimated with NMSE. Simulations are done to estimate NMSE for different delay variation of the two paths having different coding. It is noted that for the given test data, at delay of 16 ns, the NMSE increases drastically. That is equivalent to 5 meters that signal travel in free space. Therefore within a 5-meter Depth of Field (DoF) radius around the targeted receiver the summed signal is almost equivalent transmitting signal as decrypted. However that depends on phase alignment of the RF signal as the phase tolerance for a −16 dB NMSE. However, within DOF, the signal would coherently when $$\frac{\Delta L}{\lambda} = 2\pi N \pm \emptyset.$$

Where N=1, 2, 3 . . . an integer number and A is the wavelength at the carrier frequency.

Figure 10:
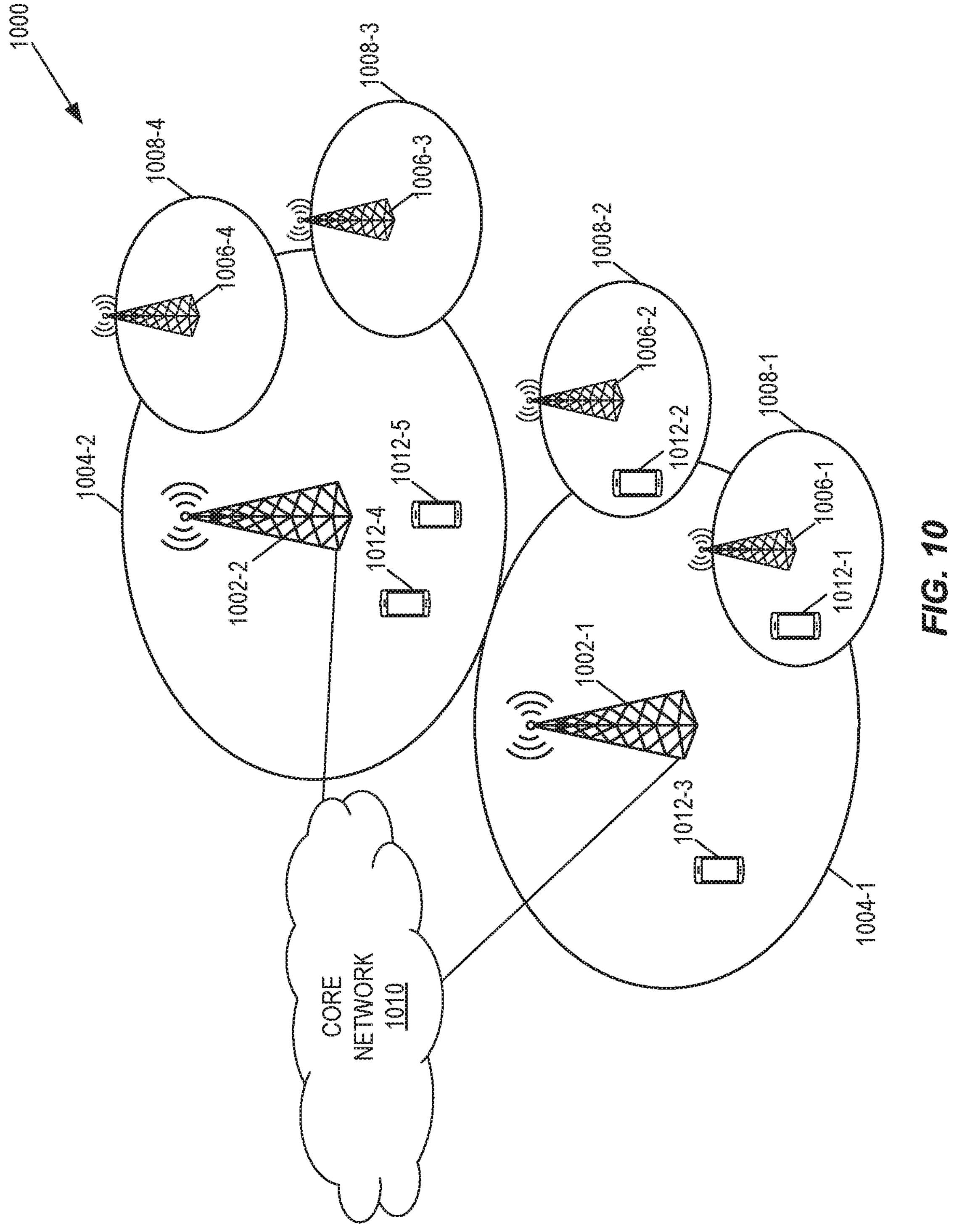
FIG. 10 illustrates one example of a cellular communications system according to some embodiments of the present disclosure.

FIG. 10 illustrates one example of a cellular communications system 1000 in which embodiments of the present disclosure may be implemented. In the embodiments described herein, the cellular communications system 1000 is a 5G system (5GS) including a Next Generation RAN (NG-RANor an Evolved Packet System (EPS) including an Evolved Universal Terrestrial RAN (E-UTRAN). In this example, the RAN includes base stations 1002-1 and 1002-2, [which in the 5GS include NR base stations (gNBs) and optionally next generation eNBs (ng-eNBs) (e.g., LTE RAN nodes connected to the 5GS Core network) and in the EPS include eNBs 1000, controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or RRHs, or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5G System (5GS) is referred to as the 5GC. The base stations 1002 (and optionally the low power nodes 1006) are connected to the core network 1010.

The base stations 1002 and the low power nodes 1006 provide service to wireless communication devices 1012-1 through 1012-5 in the corresponding cells 1004 and 1008. The wireless communication devices 1012-1 through 1012-5 are generally referred to herein collectively as wireless communication devices 1012 and individually as wireless communication device 1012. In the following description, the wireless communication devices 1012 are oftentimes UEs, but the present disclosure is not limited thereto.

Figure 11:
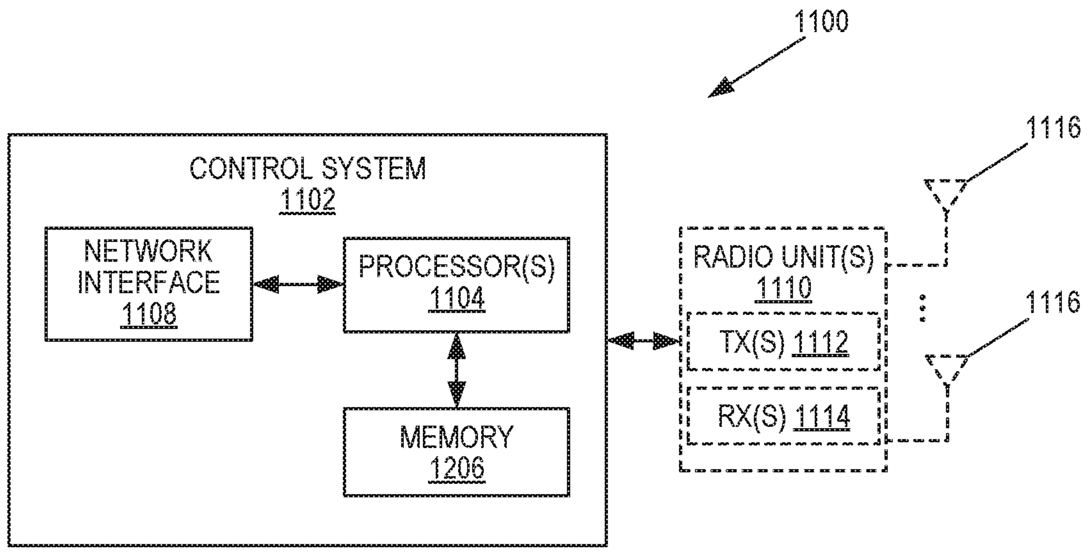
FIG. 11 is a schematic block diagram of a radio access node according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 1102 or 1106 or a network node that implements all or part of the functionality of the base station 1102 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
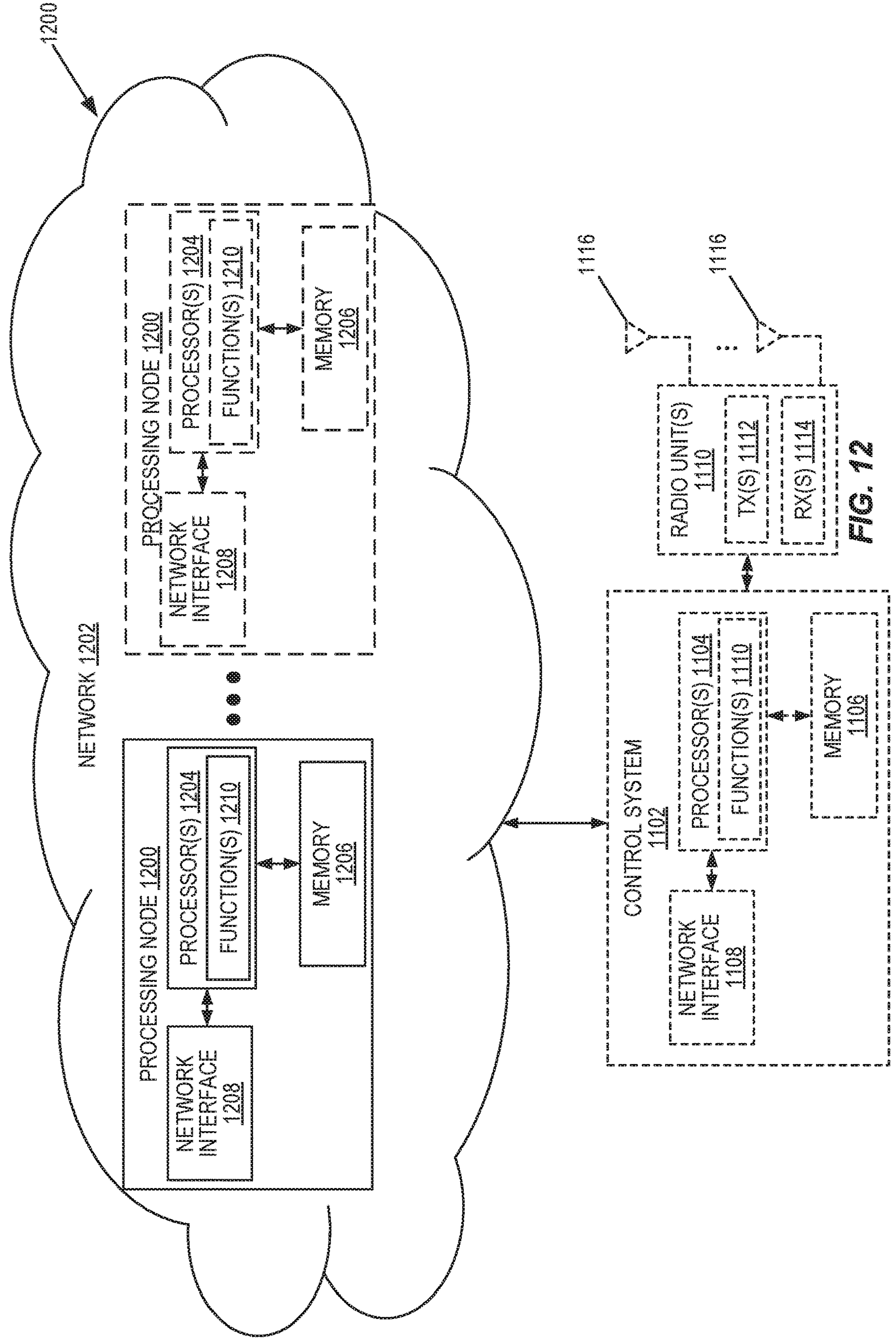
FIG. 12 is a schematic block diagram of the radio access node of FIG. 11 according to some other embodiments of the present disclosure.

FIG. 12 is a schematic block diagram that illustrates a virtualized embodiment of the radio access node 1200 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAS, and/or the like), memory 1206, and a network interface 1208.

In this example, functions 1110 of the radio access node 1100 described herein are implemented at the one or more processing nodes 1200 or distributed across the one or more processing nodes 1200 and the control system 1202 and/or the radio unit(s) 1110 in any desired manner. In some particular embodiments, some or all of the functions 1110 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1110. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1110 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
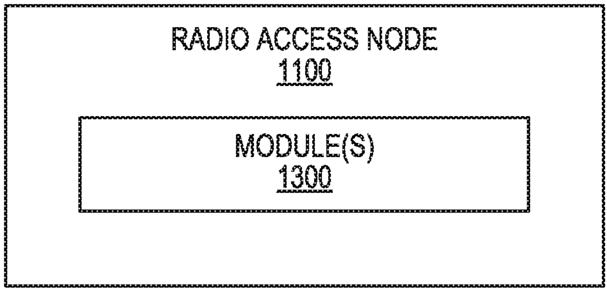
FIG. 13 is a schematic block diagram that illustrates a virtualized embodiment of the radio access node of FIG. 11 according to some embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
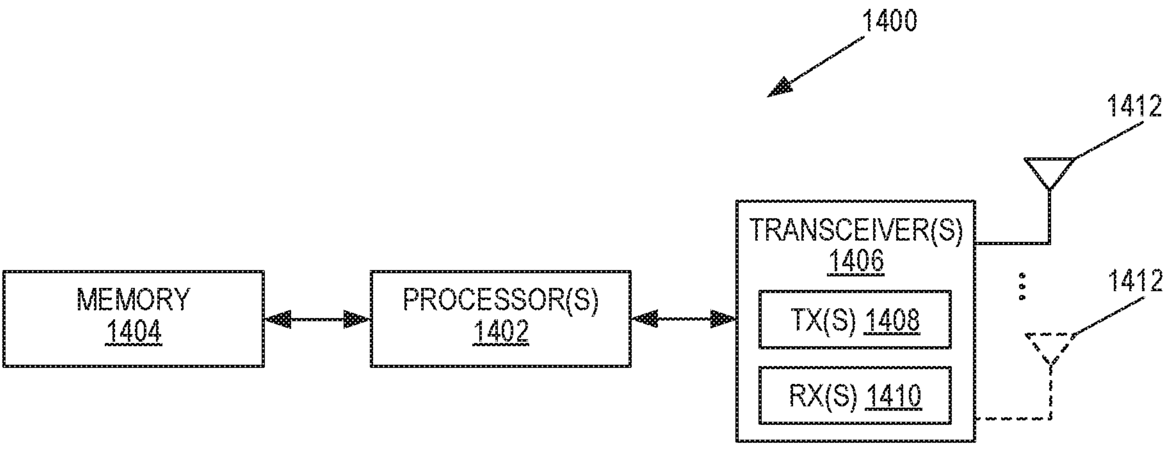
FIG. 14 is a schematic block diagram of a User Equipment device (UE) according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUS, ASICS, FPGAS, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
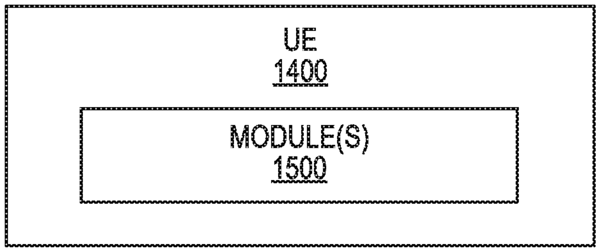
FIG. 15 is a schematic block diagram of the UE of FIG. 14 according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DCI Downlink Control Information
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MAC Medium Access Control
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
PDSCH Physical Downlink Shared Channel
P-GW Packet Data Network Gateway
PRS Positioning Reference Signal
QoS Quality of Service
RAM Random Access Memory
RAN Radio Access Network
ROM Read Only Memory
RP Reception Point
RRH Remote Radio Head
RTT Round Trip Time
SCEF Service Capability Exposure Function
SMF Session Management Function
TCI Transmission Configuration Indicator
TP Transmission Point
TRP Transmission/Reception Point
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by transmitter node for spatially encrypting a communication in a multipath environment, the method comprising:

determining multipath information for the communication between the transmitter node and a receiver node, wherein the communication comprises a first beam associated with a first set of antenna elements and a second beam associated with a second set of antenna elements;

duplicating a signal associated with the communication into a first signal and a second signal;

applying a first complex code to the first signal that modifies a phase and a gain of the first signal, wherein the first complex code is based on a complex random number generator;

applying a second complex code to the second signal that modifies a phase and a gain of the second signal, wherein the second complex code is based on a function of the first complex code, the first set of antenna elements, the second set of antenna elements, a first power associated with the first set of antenna elements, and a second power associated with the second set of antenna elements; and transmitting the first signal via the first beam and the second signal via the second beam to a receiver node.

2. The method of claim 1, further comprising, prior to the applying the first complex code:

applying a first time delay and a first set of beamforming weights to the first signal based on multipath information associated with the first beam; and applying a second time delay and a second set of beamforming weights to the second signal based on multipath information associated with the second beam.

3. The method of claim 2, wherein prior to determining the multipath information, the method further comprises:

receiving, from the receiver node, a reference signal, wherein the multipath information is based on the reference signal.

4. The method of claim 3, further comprising:

receiving from the receiver node, new reference signals at predefined intervals; and updating the multipath information based on each new reference signal for a respective interval.

5. The method of claim 1, wherein the second complex code is determined such that when a first transmission associated with the first signal and a second transmission associated with the second signal are received at the receiver node, a first encryption to the first transmission caused by the first code is canceled out by a second encryption to the second transmission caused by the second code.

6. The method of claim 1, further comprising:

updating the first complex code and the second complex code at predefined intervals.

7. The method of claim 1, wherein the first beam and the second beam traverse different paths to the receiver node.

8. The method of claim 1, wherein the first signal and the second signal are identical prior to the first set of beamforming weights and the second set of beamforming weights being applied.

9. The method of claim 1, wherein the first beam and the second beam are associated with spatial multiplexing channels with highest signal strengths.

10. The method of claim 1, wherein the first power associated with the first set of antenna elements is based at least in part on the gain of the first signal and a number of antenna elements of the first set of antenna elements.

11. The method of claim 1, wherein the second power associated with the second set of antenna elements is based at least in part on the gain of the second signal and a number of antenna elements of the second set of antenna elements.

12. A transmitter node configured to spatially encrypt a communication in a multipath environment comprising a radio interface and processing circuitry configured to:

determine multipath information for the communication between the transmitter node and a receiver node, wherein the communication comprises a first beam associated with a first set of antenna elements and a second beam associated with a second set of antenna elements;

duplicate a signal associated with the communication into a first signal and a second signal;

apply the first signal with a first complex code that modifies a phase and a gain of the first signal, wherein the first complex code is based on a complex random number generator;

apply the second signal with a second complex code that modifies a phase and a gain of the second signal, wherein the second complex code is based on a function of the first complex code, the first set of antenna elements, the second set of antenna elements, a first power associated with the first set of antenna elements, and a second power associated with the second set of antenna elements; and transmit, to the receiver node, the first signal via the first beam and the second signal via the second beam.

13. The transmitter node of claim 11, wherein the processing circuitry is further configured to, prior to the applying the first complex code:

apply a first time delay and a first set of beamforming weights to the first signal based on multipath information associated with the first beam; and apply a second time delay and a second set of beamforming weights to the second signal based on multipath information associated with the second beam.

14. The transmitter node of claim 13, wherein prior to determining the multipath information, the processing circuitry is further configured to:

receive, from the receiver node, a reference signal, wherein the multipath information is based on the reference signal.

15. The transmitter node of claim 14, wherein the processing circuitry is further configured to:

receive from the receiver node, new reference signals at predefined intervals; and update the multipath information based on each new reference signal for a respective interval.

16. The transmitter node of claim 12, wherein the second complex code is determined such that when a first transmission associated with the first signal and a second transmission associated with the second signal are received at the receiver node, a first encryption to the first transmission caused by the first code is canceled out by a second encryption to the second transmission caused by the second code.

17. The transmitter node of claim 12, wherein the processing circuitry is further configured to:

update the first complex code and the second complex code at predefined intervals.

18. The transmitter node of claim 12, wherein the first beam and the second beam traverse different paths to the receiver node.

19. The transmitter node of claim 12, wherein the first signal and the second signal are identical prior to the first set of beamforming weights and the second set of beamforming weights being applied.

20. The transmitter node of claim 12, wherein the first beam and the second beam are associated with spatial multiplexing channels with highest signal strengths.

* * * * *